Feb. 22, 1944. W. A. McMILLAN 2,342,206
PRESSURE AND TEMPERATURE RECORDING APPARATUS
Filed Nov. 9, 1940
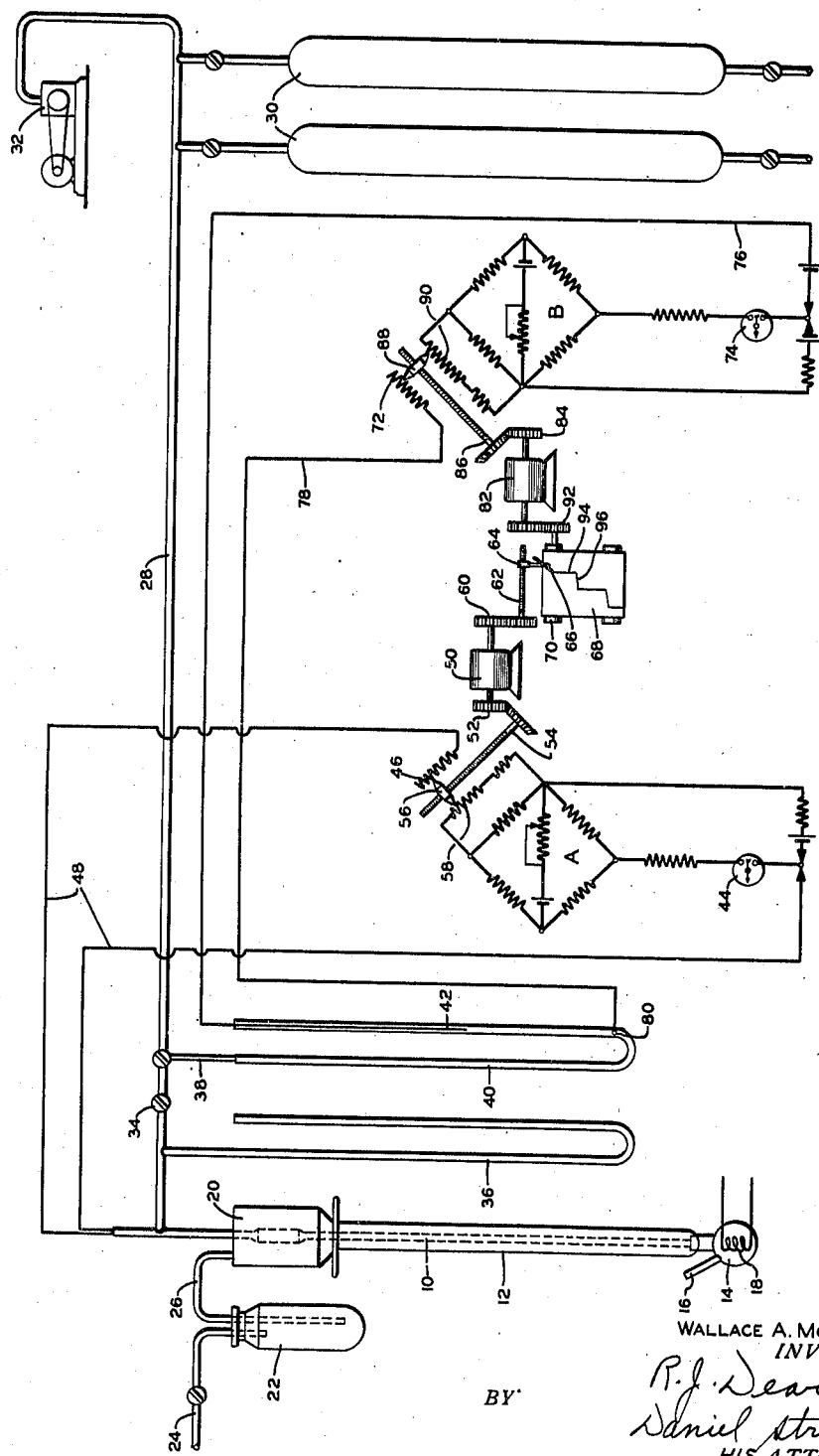
WALLACE A. McMILLAN
INVENTOR
BY R. J. Dearborn
Daniel Stryker
HIS ATTORNEYS Patented Feb. 22, 1944

2,342,206

UNITED STATES PATENT OFFICE 2,342,206

PRESSURE AND TEMPERATURE RECORDING APPARATUS

Wallace A. McMillan, Forest Hills, N. Y., assignor, by mesne assignments, to The Texas Company, New York, N. Y., a corporation of Delaware Application November 9, 1940, Serial No. 364,995

3 Claims. (Cl. 73—345)

This invention relates to distilling and fractionating apparatus of the type adapted for the analysis of mixtures of volatile liquids, gases or vapors containing condensable liquid fractions and more particularly to apparatus of this character by means of which the temperatures and pressures of fractionation may be accurately and automatically recorded.

The principal object of the invention is to provide an apparatus for precise analytical distillation and fractionation in which the temperatures and pressures of the fractionated vapors are automatically recorded without the necessity of manual operation.

Apparatus for analytical distillation and fractionation comprising essentially a distilling bulb, an elongated fractionating tube or column surmounting the bulb and a condenser section at the upper end of the fractionating tube with equipment for cooling and measuring the distilled vapors is known; for example, see Podbielniak Patent No. 1,917,272, granted July 11, 1933. Apparatus of this type operates on the principle of sharp relatively adiabatic fractionation to separate constituents of the mixture being analyzed in the order of their boiling points. Apparatus of this type which is available on the market has so far sufficed to provide only approximate analysis of the mixtures and has proved to be incapable of giving accurate quantitative results, or even reproducible results with different operators.

An apparatus by means of which accurate and reproducible results may be obtained is described in my Patent No. 2,005,323, granted June 18, 1935. However, the proper operation of that apparatus necessitates the constant attendance of at least one operator, since it is necessary to make various manual adjustments to the apparatus during the distilling and fractionation of a given mixture. In my copending application, Serial No. 359,853, I have disclosed an apparatus for accomplishing these results and in which the distillation rates, temperatures, and pressures of fractionation are automatically recorded, utilizing a combination of electrical and mechanical means. In the apparatus now to be described, the temperatures and pressures of the fractionated vapors are recorded automatically through the utilization of an electrical system whereby an extremely accurate record can be made and without the frequent attendance of an operator. Furthermore, the apparatus embodying this invention does not require the use of fragile and expensive elements which are often difficult to obtain.

In accordance with the present invention, an apparatus comprising a distilling bulb, an elongated, adiabatic, fractionating tube disposed thereabove and surmounted by a condenser section is provided. A pair of Wheatstone bridge circuits connect temperature and pressure sensitive elements to electric motors adapted respectively to actuate a chart roll and a pen for tracing a record on the chart. The pen is arranged to trace a record on the chart roll in accordance with variations in the temperature of the fractionated vapors, while at the same time the chart roll is automatically advanced so that the chart travel is directly proportional to increases in pressure of the vapors.

For a further understanding of the invention, reference may be had to the accompanying drawing in which the single figure is an elevational view, generally diagrammatic, showing an apparatus embodying the improvements of the present invention.

Referring to the drawing, an elongated fractionating tube 10 is provided with a vacuum jacket 12 and at its lower end with a distilling bulb 14 to which the sample may be supplied through tube 16, and which may, if desired, be surrounded by a suitable Thermos bottle for low temperature work. An electrical heating coil 18 in the bulb 14 affords means for the controlled heating of the sample. The upper end of the tube 10 is cooled by a partial condenser 20 to which is supplied a cooling medium, such as liquid air or liquid nitrogen from a vessel 22. Compressed air may be supplied through the pipe 24 to the vessel 22 to force the cooling medium into the condenser through the pipe 26. Vapors which remain uncondensed pass through a conduit 28 which forms a vapor passage connecting the fractionating tube with one or more receivers 30. A source of vacuum, such as a vacuum pump 32, is preferably connected to the vapor conduit 28. The pressure of distillation may be controlled by a suitable adjustable rate valve 34 and may be measured by a manometer 36 communicating with the conduit 28. Also communicating with the conduit 28 by means of a valve connection 38 is a manometer 40 in one leg of which is disposed a bare resistance wire 42 forming part of the electrical circuit to be described.

There are available on the market a number of temperature recorders which operate on the Wheatstone bridge principle, utilizing a slide wire balance which is automatically adjusted by a motor drive at fixed intervals so that the galvanometer is kept at a value of zero substantially when the circuit is connected to a standard electrical cell. The recording pen is mechanically connected to the motor drive so that adjustments of the slide wire position are reflected as changes of temperature on the chart. In most of such equipment the chart is driven separately by a synchronous motor so that chart travel is directly proportional to time when utilizing an electrical circuit of constant frequency. An illustration of a potentiometer pyrometer embodying these principles appears on page 2 of section 1128 of a publication entitled "Instructions for Brown Instruments and Accessories," dated November 1, 1936, and published by the Brown Instrument Company, of Philadelphia, Pa.

In accordance with the present invention, the chart is driven in a manner such that the chart travel will be directly proportional to increases in pressure of the fractionated vapors. To this end a Wheatstone bridge circuit indicated generally at A and having a galvanometer 44 and a slide wire resistance member 46 is connected so that the leg containing the resistance 46 also includes a thermocouple mounted in the upper end of the fractionating tube 10 and connected to the bridge circuit by means of wires 48. A motor 50 is connected to drive through suitable gearing 52 a spiral grooved or threaded shaft 54 on which is mounted a contact or follower member 56 adapted to make contact between the resistances 46 and 58 of the Wheatstone bridge circuit. The other end of the shaft of the motor 50 is connected to drive through suitable gearing 60, another spiral-grooved shaft 62 having a follower member 64 adapted to move longitudinally of the shaft 62 when the latter is rotated. Attached to the member 64 is a recording pen 66 adapted to trace a line on a chart 68 driven by means of a chart roll 70.

In order to drive or advance the chart roll 68, in accordance with variations in pressure of the fractionated vapors, a second Wheatstone bridge circuit B is provided, this circuit being substantially the same as the circuit A and provided with a slide wire resistance 72 and a galvanometer 74. One leg of the Wheatstone bridge circuit B is connected through wires 76 and 78, respectively, with the wire 42 mounted in the manometer 40 and with a contact 80 disposed in the lower portion of the manometer so as to be in constant contact with the mercury of the manometer. A motor 82 is arranged to drive through suitable gearing 84 a spiral-grooved shaft 86 on which is mounted a slider or contact member 88 adapted to move longitudinally of the shaft 86 in contact with the resistances 72 and 90 when the shaft 86 is rotated. The motor also drives through gearing 92 the chart roll 70 so as to advance the chart 68 when the member 88 is moved to vary the resistance to balance the bridge circuit B.

In operation, the valve 34, which may be operated manually or automatically in response to variations in the pressure of the vapors in the passage 28 (as is described in my aforementioned Patent No. 2,005,323 and in the copending application Serial No. 359,853), is set to control the rate of distillation and the distillation pressure may be noted by means of the manometer 36. The valve between the vapor passage 28 and the off-take 38 is open, as well as the valve in the line to one of the receivers 30 in which it is desired to collect the distilled vapors. The pressure of the vapors in the receiver, acting upon the mercury in the manometer 40 will cause the level of the mercury to assume a certain position in the legs of the manometer and a certain length of the wire 42 will thereby be covered by the mercury, thus providing a decreased resistance in the leg of the Wheatstone bridge circuit B containing the slide wire 72. The motor 82 is energized at intervals by any suitable means through connections, not shown, so as to rotate the shaft 86 to move the contact member 88 along the resistances 72 and 90 to balance the bridge. At the same time, the chart roll 70 is also rotated to advance the chart 68 an amount proportional to the variation in resistance of the wire 42 caused by the variation in the level of the mercury in the leg manometer 40.

The variations in temperature in the fractionating tube 10 energize the thermocouple connected by the wires 48 in circuit with the slide wire resistance 46 of the Wheatstone bridge A and the motor 50 is periodically energized in a manner similar to the motor 82 so as to move the slide member 56 to bring the bridge circuit A into balance. At the same time the motor 50 rotates the spiral-grooved shaft 62 so as to position the member 64 and the pen 66 on the chart 68. Thus it will be seen that the pen 66 will trace a record of the fractionating temperatures on the chart 68, which chart will be automatically advanced in amounts proportional to increases in pressure of the vapors passing to the receiver 30.

As long as a certain component of a gaseous mixture is being distilled from the column 10, the temperature will, of course, remain substantially constant. The pressure in the receiver 30 and the conduit 28 will, however, increase during this period and the pen 66 will draw a straight vertical line, such as the line 94 on the chart 68. When the distillation of one component of the gaseous mixture has been completed, the temperature will, of course, rise until the boiling point of the next component or the next constant boiling mixture is reached. The pen 66 will thereupon move substantially horizontally a certain distance across the chart 68 as indicated at 96 with very little vertical movement of the chart during this time so that the distillation curve will be a series of slopes and plateaus in the usual manner. The proportion of any ingredient in the gaseous mixture can be readily computed from the chart by calculation of the ratio of the length of the vertical line representing the distillation of that component to the total vertical length of the chart during the entire distillation.

Obviously many modifications and variations of the invention, as hereinbefore set forth, may be made without departing from the spirit and scope thereof, and therefore only such limitations should be imposed as are indicated in the appended claims.

I claim:

1. An apparatus for recording the pressures and temperatures of gases passing through a conduit from a fractionating column to a receiver comprising a recording instrument having a chart, a chart roll and a pen for making a record on said chart, a Wheatstone bridge circuit having a slide-wire resistance in one leg thereof and means to adjust said resistance periodically to balance said circuit, means connected in said circuit and responsive to variations in pressure in said conduit for unbalancing said circuit when said pressure increases, a driving connection between said resistance adjusting means and said chart roll whereby said chart is advanced in response to said pressure increases, and means responsive to temperature variations in said conduit for moving said pen substantially laterally on said chart when said temperature increases, said last-mentioned means comprising a second Wheatstone bridge circuit having a slide-wire resistance in one leg thereof and means to adjust said resistance periodically to balance said bridge, a temperature responsive element in said conduit and connected in series with last-mentioned slide-wire resistance whereby said second bridge circuit will be unbalanced when said temperature increases, and a driving connection between said second-mentioned resistance adjusting means and said pen.

2. In apparatus for recording the pressures and temperatures of gases passing through a vapor off-take from a fractionating column, the improvements which comprise a Wheatstone bridge circuit, a slide-wire adjustable resistance in one leg of said circuit, a movable member in contact with said resistance, a motor adapted to move said member to vary said resistance to balance said circuit, a recording instrument having a chart roll, a chart and a pen for making a record on said chart, a driving connection between said motor and said chart roll, a variable resistance member connected in series with said first-mentioned resistance and adapted to be varied in response to changes in the pressure in said vapor off-take, a second Wheatstone bridge circuit having a variable resistance in one leg thereof, means to adjust said last-named variable resistance periodically to balance said second bridge, means responsive to variations in temperature in said vapor off-take connected in series with the variable resistance of the second Wheatstone bridge for unbalancing said second bridge, and a driving connection between said resistance adjusting means and said pen.

3. In apparatus for recording the pressures and temperatures of gases passing through a vapor off-take from a fractionating column, the improvements which comprise a Wheatstone bridge circuit, a slide-wire adjustable resistance in one leg of said circuit, a movable member in contact with said resistance, a motor adapted to move said member to vary said resistance to balance said circuit, a recording instrument having a chart roll, a chart and a pen for making a record on said chart, a driving connection between said motor and said chart roll, a mercury manometer communicating with said vapor off-take, a bare resistance wire extending through a portion of one leg of said manometer in contact with the mercury in said leg, said wire and said mercury being connected in said leg of said Wheatstone bridge circuit in series with said slide wire resistance so that movement of the mercury in contact with said bare resistance wire will vary the resistance of the leg of the bridge circuit containing said slide wire resistance, a second Wheatstone bridge circuit having a slide wire adjustable resistance in one leg thereof, means to adjust said last-named resistance periodically to balance said second bridge, means responsive to variations in temperature in said vapor off-take connected in series with the adjustable resistance of said second Wheatstone bridge for unbalancing said second bridge, and a driving connection between the balancing means for the second bridge and said pen for moving said pen laterally of said chart in accordance with movements of the balancing means for the second bridge.

WALLACE A. McMILLAN.